United States Patent
Langhammer

(10) Patent No.: US 10,042,607 B2
(45) Date of Patent: Aug. 7, 2018

(54) VARIABLE PRECISION FLOATING-POINT MULTIPLIER

(71) Applicant: Altera Corporation, San Jose, CA (US)

(72) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 60 days.

(21) Appl. No.: 15/242,923

(22) Filed: Aug. 22, 2016

(65) Prior Publication Data

US 2018/0052661 A1    Feb. 22, 2018

(51) Int. Cl.
*G06F 7/485* (2006.01)
*G06F 7/487* (2006.01)

(52) U.S. Cl.
CPC ........... *G06F 7/4876* (2013.01); *G06F 7/485* (2013.01); *G06F 2207/382* (2013.01); *G06F 2207/3816* (2013.01); *G06F 2207/483* (2013.01)

(58) Field of Classification Search
CPC ............... G06F 7/4876; G06F 7/5324; G06F 2207/3816–2207/382
See application file for complete search history.

(56) References Cited

U.S. PATENT DOCUMENTS

| | | | |
|---|---|---|---|
| 3,434,114 A | 3/1969 | Arulpragasam et al. | |
| 4,893,268 A * | 1/1990 | Denman, Jr. | G06F 7/5275 708/627 |
| 5,515,520 A * | 5/1996 | Hatta | G06F 7/483 708/550 |

(Continued)

FOREIGN PATENT DOCUMENTS

WO   01-09712 A1   2/2001
WO   2013-148619 A1   10/2013

OTHER PUBLICATIONS

S.F. Oberman, "Floating Point Division and Square Root Algorithms and Implementation in the AMD-K7 Microprocessor", Proc. 14th Symp. Computer Arithmetic (ARITH14), pp. 106-115, Apr. 1999.*

(Continued)

*Primary Examiner* — Matthew Sandifer
(74) *Attorney, Agent, or Firm* — Treyz Law Group, P.C.; Jason Tsai

(57) ABSTRACT

Integrated circuits with specialized processing blocks are provided. The specialized processing blocks may include floating-point multiplier circuits that can be configured to support variable precision. A multiplier circuit may include a first carry-propagate adder (CPA), a second carry-propagate adder (CPA), and an associated rounding circuit. The first CPA may be wide enough to handle the required precision of the mantissa. In a bridged mode, the first CPA may borrow an additional bit from the second CPA while the rounding circuit will monitor the appropriate bits to select the proper multiplier output. A parallel prefix tree operable in a non-bridged mode or the bridged mode may be used to compute multiple multiplier outputs. The multiplier circuit may also include exponent and exception handling circuitry using various masks corresponding to the desired precision width.

17 Claims, 12 Drawing Sheets

(56) References Cited

U.S. PATENT DOCUMENTS

| | | | |
|---|---|---|---|
| 5,696,711 A * | 12/1997 | Makineni | G06F 7/483 |
| | | | 708/497 |
| 5,909,385 A * | 6/1999 | Nishiyama | G06F 7/5338 |
| | | | 708/497 |
| 5,917,741 A * | 6/1999 | Ng | G06F 7/483 |
| | | | 708/497 |
| 6,480,872 B1 | 12/2002 | Choquette | |
| 7,948,267 B1 | 5/2011 | Mauer et al. | |
| 8,706,790 B1 | 4/2014 | Langhammer | |
| 8,949,298 B1 | 2/2015 | Langhammer | |
| 9,098,332 B1 * | 8/2015 | Langhammer | G06F 7/49947 |
| 9,104,474 B2 | 8/2015 | Kaul et al. | |
| 9,189,200 B1 | 11/2015 | Langhammer | |
| 2002/0194240 A1 | 12/2002 | Pangal et al. | |
| 2004/0254971 A1 | 12/2004 | Dirker et al. | |
| 2006/0117080 A1 | 6/2006 | Lutz et al. | |
| 2010/0023568 A1 | 1/2010 | Hickey et al. | |
| 2013/0007084 A1 | 1/2013 | Nystad | |
| 2014/0188968 A1 | 7/2014 | Kaul et al. | |
| 2015/0169289 A1 * | 6/2015 | Tannenbaum | G06F 7/4876 |
| | | | 708/503 |
| 2016/0062954 A1 | 3/2016 | Ruff et al. | |

OTHER PUBLICATIONS

K. Manolopoulos, D. Reisis, V. Chouliaras, "An efficient multiple precision floating-point multiplier", Proc. 18th IEEE Int. Conf. Electron. Circuits Syst., pp. 153-156, 2011.*

H. Thapliyal, H.R. Arabnia, A.P.Vinod, "Combined integer and floating point multiplication architecture(CIFM) for FPGAs and its reversible logic implementation", Proceedings MWSCAS 2006, Aug. 2006.*

* cited by examiner

VARIABLE PRECISION FLOATING-POINT MULTIPLIER

BACKGROUND

This invention relates generally to integrated circuit and, in particular, to integrated circuits with multiplier circuitry.

Programmable logic devices (PLDs) include logic circuitry such as look-up tables (LUTs) and sum-of-product based logic that are designed to allow a user to customize the circuitry to the user's particular needs. This configurable logic is typically divided into individual logic circuits that are referred to as logic elements (LEs). The LEs may be grouped together to form larger logic blocks referred to as logic array blocks (LABs) that may be configured to share the same resources (e.g., registers and memory). In addition to this configurable logic, PLDs also include programmable interconnect or routing circuitry that is used to connect the inputs and outputs of the LEs and LABs. The combination of this programmable logic and routing circuitry is referred to as soft logic.

Besides soft logic, PLDs may also include specialized processing blocks that implements specific predefined logic functions and thus cannot be configured by the user. Such specialized processing blocks may include a concentration of circuitry on a PLD that has been partly or fully hardwired to perform one or more specific tasks, such as a logical or a mathematical operation. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), logic AND/NAND/OR/NOR arrays, etc., or combinations thereof.

One particularly useful type of specialized processing block that has been provided on PLDs is a digital signal processing (DSP) block. A conventional DSP block includes two 18-by-19 multipliers, which can be combined with other internal circuitry to serve as a 27-by-27 multiplier. The 27-by-27 multiplier is used as part of an IEEE 754 single precision floating-point multiplier, which requires 23 bits of precision. The DSP block can also use the two 18-by-19 multipliers to support two separate multiplication operations. It may be desirable to configure the DSP to support a wide range of intermediate precisions to help improve the functional density of the DSP block.

It is within this context that the embodiments described herein arise.

SUMMARY

A programmable integrated circuit that includes specialized processing blocks (sometimes referred to as digital signal processing blocks) is provided. The specialized processing blocks may include multiplier circuitry. The multiplier circuitry may include a first carry-propagate adder (CPA), a second CPA, and associated rounding circuit that receives signals from both the first and second CPAs. In particular, the first and second adders may be used to generate a first floating-point multiplier output having a first precision during a first mode and to generate a second floating-point multiplier output having a second precision that is different than the first precision during a second mode.

A multiplexer may be used to route a selected most significant bit of the first CPA to the rounding circuit. The rounding circuit may also receive the carry out signal of the most significant bit (MSB) of the first CPA. In the first mode, the rounding circuit may receive two least significant bits (LSBs) directly from the first CPA. In the second mode, however, the rounding circuit may receive a first bit from an adder circuit that receives an LSB of the first CPA and a carry out signal from an MSB of the second CPA, and a second bit directly from the MSB of the second CPA.

In accordance with another embodiment, the multiplier circuitry may also include exponent handling circuitry. The exponent handling circuitry may include an input adder circuit, a subtraction circuit, and an output adder circuit. The input adder circuit may receive a first exponent signal and a second exponent signal and may output a first output. The subtraction circuit may receive the first output from the input adder circuit, receive an adjustable bias value, and generate a second output. The adjustable bias value varies as a function of the precision of the received first and second exponent signals. The output adder circuit may receive the second output and also an adjustable normalization value. The normalization value may be varied depending on the rounding position between the first and second CPAs.

In accordance with yet another suitable embodiment, the multiplier circuitry may also include exception handling circuitry for monitoring both the exponent and mantissa bits. The exception handling circuitry may include a logic AND mask that processes MSBs of the exponent/mantissa bits and a logic OR gate that receives signals from the logic AND mask that that directly receives LSBs of the exponent/mantissa bits to determine whether a zero value has been detected. The exception handling circuitry may also include a logic OR mask that processes MSBs of the exponent/mantissa bits and a logic AND gate that receives signals from the logic OR mask that that directly receives LSBs of the exponent/mantissa bits to determine whether a maximum value has been detected.

Further features of the invention, its nature and various advantages will be more apparent from the accompanying drawings and following detailed description.

DETAILED DESCRIPTION

The embodiments presented herein relate to integrated circuits and, more particularly, to multipliers on an integrated circuit.

It will be recognized by one skilled in the art, that the present exemplary embodiments may be practiced without some or all of these specific details. In other instances, well-known operations have not been described in detail in order not to unnecessarily obscure the present embodiments.

Figure 1:
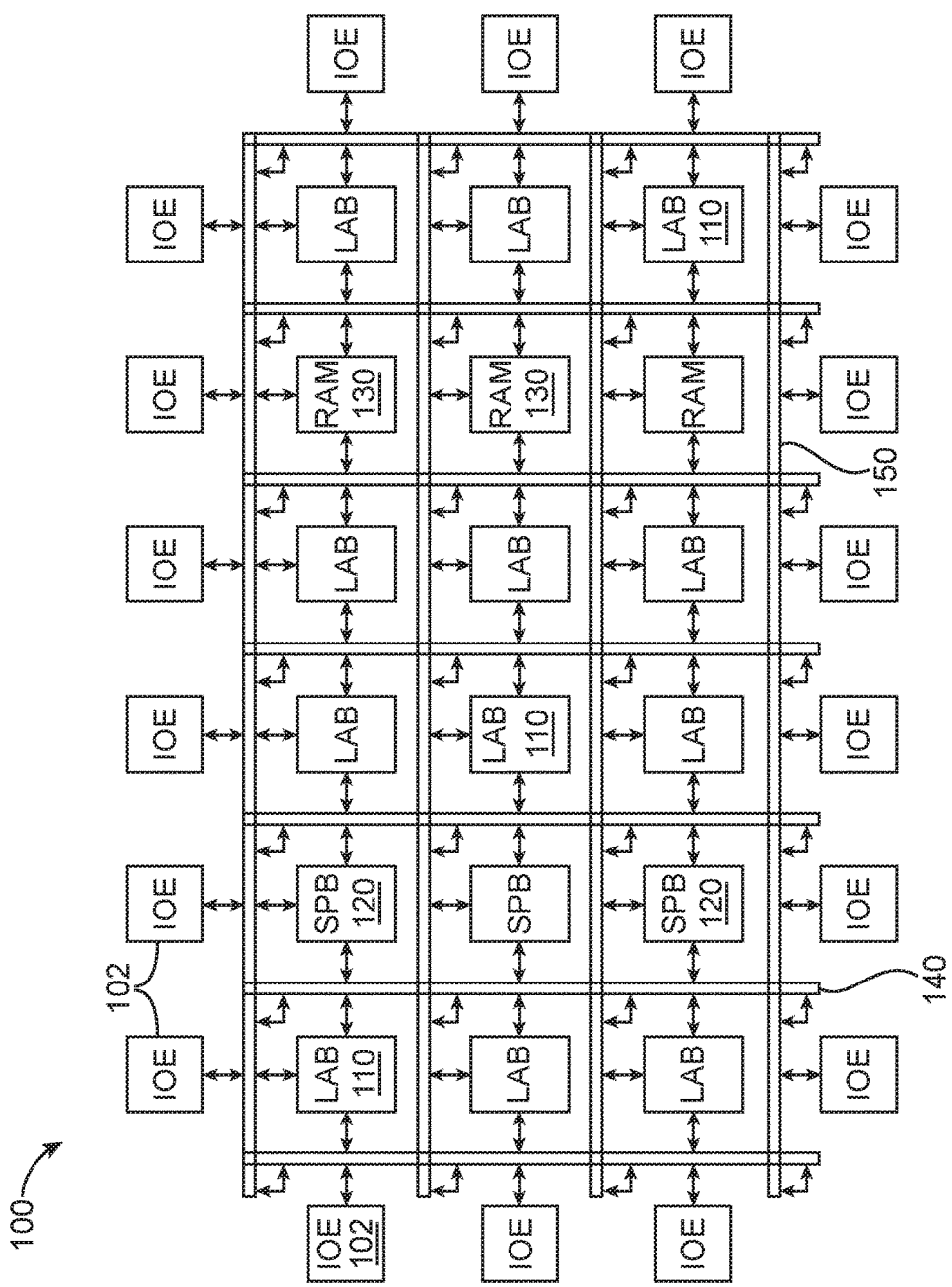
FIG. 1 is a diagram of an illustrative integrated circuit having specialized processing blocks in accordance with an embodiment.

An illustrative embodiment of an integrated circuit such as programmable logic device (PLD) 100 having an exemplary interconnect circuitry is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and specialized processing blocks such as specialized processing blocks (SPB) 120. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, SPB 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, mechanical memory devices (e.g., including localized mechanical resonators), mechanically operated RAM (MORAM), combinations of these structures, etc. Because the memory elements are loaded with configuration data during programming, the memory elements are sometimes referred to as configuration memory, configuration RAM (CRAM), configuration memory elements, or programmable memory elements.

In addition, the programmable logic device may have input/output elements (IOEs) 102 for driving signals off of device 100 and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include double data rate interconnections and/or single data rate interconnections.

If desired, routing wires may be shorter than the entire length of the routing channel. A length L wire may span L functional blocks. For example, a length four wire may span four blocks. Length four wires in a horizontal routing channel may be referred to as "H4" wires, whereas length four wires in a vertical routing channel may be referred to as "V4" wires.

Different PLDs may have different functional blocks which connect to different numbers of routing channels. A three-sided routing architecture is depicted in FIG. 1 where input and output connections are present on three sides of each functional block to the routing channels. Other routing architectures are also intended to be included within the scope of the present invention. Examples of other routing architectures include 1-sided, 1½-sided, 2-sided, and 4-sided routing architectures.

In a direct drive routing architecture, each wire is driven at a single logical point by a driver. The driver may be associated with a multiplexer which selects a signal to drive on the wire. In the case of channels with a fixed number of wires along their length, a driver may be placed at each starting point of a wire.

Note that other routing topologies, besides the topology of the interconnect circuitry depicted in FIG. 1, are intended to be included within the scope of the present invention. For example, the routing topology may include diagonal wires, horizontal wires, and vertical wires along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
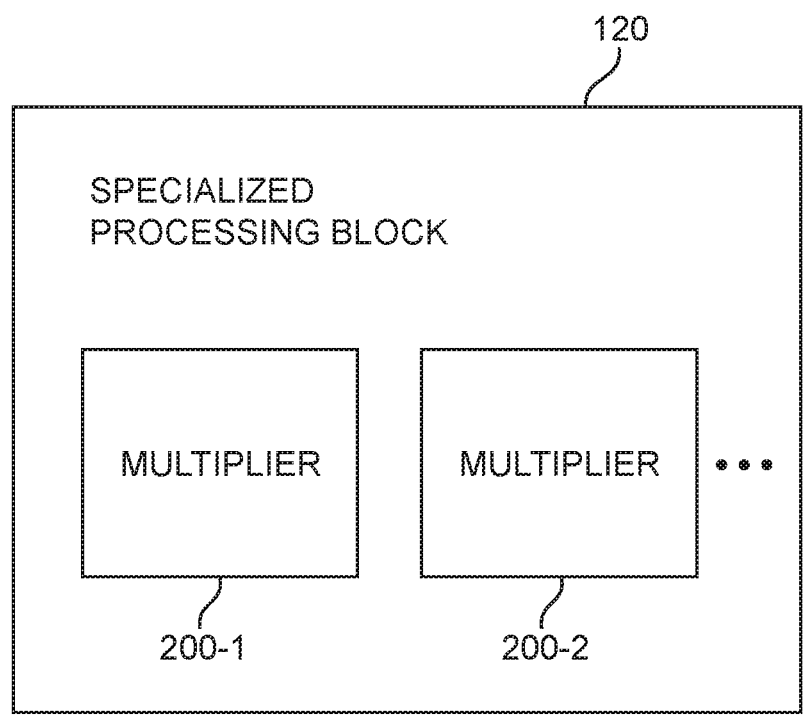
FIG. 2 is a diagram showing how a specialized processing block may include two or more multiplier circuits in accordance with an embodiment.

FIG. 2 is a diagram showing how a specialized processing block may include two or more multiplier circuits in accordance with an embodiment. As shown in FIG. 2, specialized processing block (sometimes referred to as a digital signal processing block or "DSP" block) may include at least a first multiplier circuit 200-1 and a second multiplier circuit 200-2. As an example, multiplier circuits 200-1 and 200-2 may each be an 18-by-19 multiplier circuit, which can be used collectively to support an IEEE 754 single precision floating-point multiplication operation.

Floating-point numbers are commonplace for representing real numbers in scientific notation in computing systems and are designed to cover a large numeric range and diverse precision requirements. The IEEE 754 standard is commonly used for floating-point numbers. A floating-point number includes three different parts: (1) the sign of the floating-point number, (2) the mantissa, and (3) the exponent. Each of these parts may be represented by a binary number and, in the IEEE 754 format, have different bit sizes depending on the precision. For example, a single precision floating-point number requires 32 bits, which are distributed as follows: one sign bit (bit 32), eight exponent bits (bits [31:24]), and 23 mantissa bits (bits [23:1]). A double precision floating-point number requires 64 bits including one sign bit (bit 64), 11 exponent bits (bits [63:53]), and 52 mantissa bits (bits [52:1]).

The sign of a floating-point number according to standard IEEE 754 is represented using a single bit, where a "0" denotes a positive number and a "1" denotes a negative number.

The exponent of a floating-point number preferably is an unsigned binary number which, for the single precision format, ranges from 0 to 255. In order to represent a very small number, it is necessary to use negative exponents. Thus, the exponent preferably has a negative bias. For single precision floating-point numbers, the bias preferably is −127. For example a value of 140 for the exponent actually represents (140−127)=13, and a value of 100 represents (100−127)=−27. For double precision numbers, the exponent bias preferably is −1023.

As discussed above, according to the IEEE 754 standard, the mantissa is a normalized number (i.e., it has no leading zeroes and represents the precision component of a floating point number). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision. Thus, the single precision format effectively has 24 bits of precision (i.e., 23 mantissa bits plus one implied bit).

Referring still to FIG. 2, multiplier circuits 200-1 and 200-2 within specialized processing block 120 may be combined with other internal circuitry to form a 27-by-27 multiplier, which can be used to efficiently support single precision floating-point arithmetic. The single precision floating point arithmetic as defined by the IEEE 754 standard may be referred to as "FP32," since the single precision floating-point number requires 32 bits (see, e.g., the first row in table 300 of FIG. 3).

For certain applications including machine learning applications such as Convolution Neural Networks (CNN), it may be more efficient if the two multipliers 200 within DSP block 120 are used separately to support "FP16" arithmetic, which involves floating-point numbers with one sign bit, five exponent bits, and 10 mantissa bits. Including the implied leading bit, FP16 effectively has an 11-bit mantissa.

Figure 3:
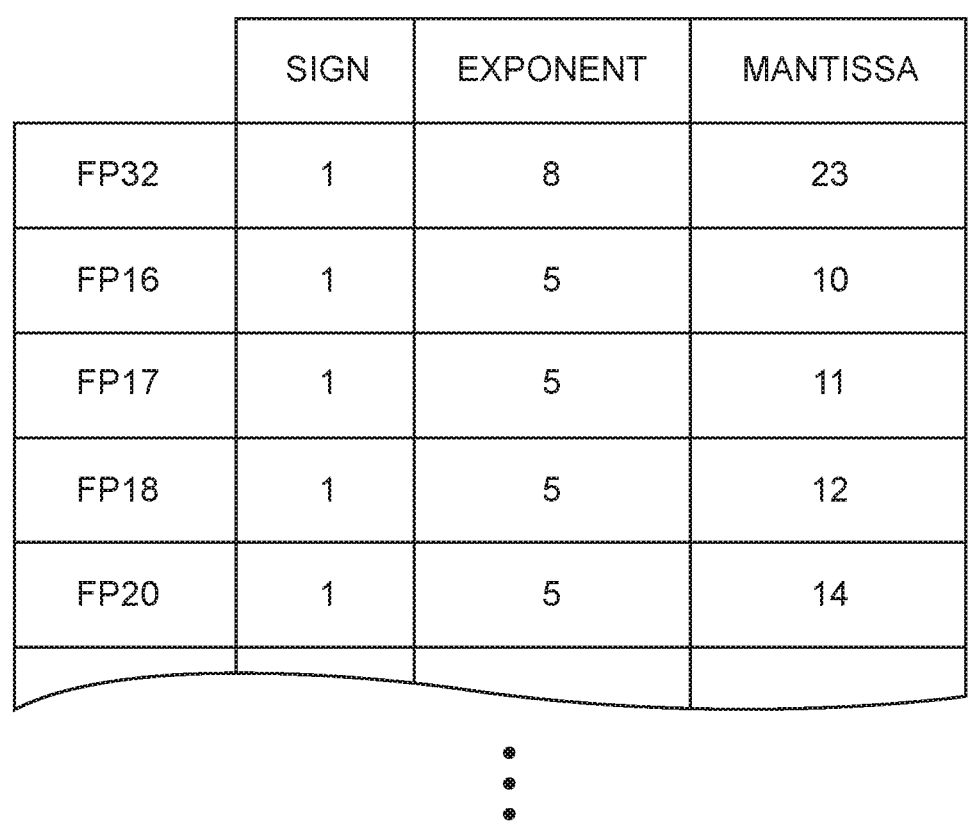
FIG. 3 is a diagram showing different precisions that can be supported using a multiplier circuit of FIG. 2 in accordance with an embodiment.

In accordance with an embodiment, multipliers 200 may not only be configured to support FP32 and FP16, but may also be configured to support a wide range of intermediate sizes such as FP17, FP18, FP20, etc. Configured in this way, DSP 120 can support twice the functional density relative to FP32 operations. As shown in FIG. 3, FP17 may involve floating-point numbers with one sign bit, five exponent bits, and 11 mantissa bits; FP18 may involve floating-point numbers with one sign bit, five exponent bits, and 12 mantissa bits; and FP20 may involve floating-point numbers with one sign bit, five exponent bits, and 14 mantissa bits (as examples).

The number of bits allocated to the exponent and mantissa portions as shown in table 300 is merely illustrative and does not serve to limit the present embodiments. If desired, the exponent for each of the various floating-point formats may be more or less than five bits, and the number of mantissa bits may be adjusted based on the exponent.

Figure 4:
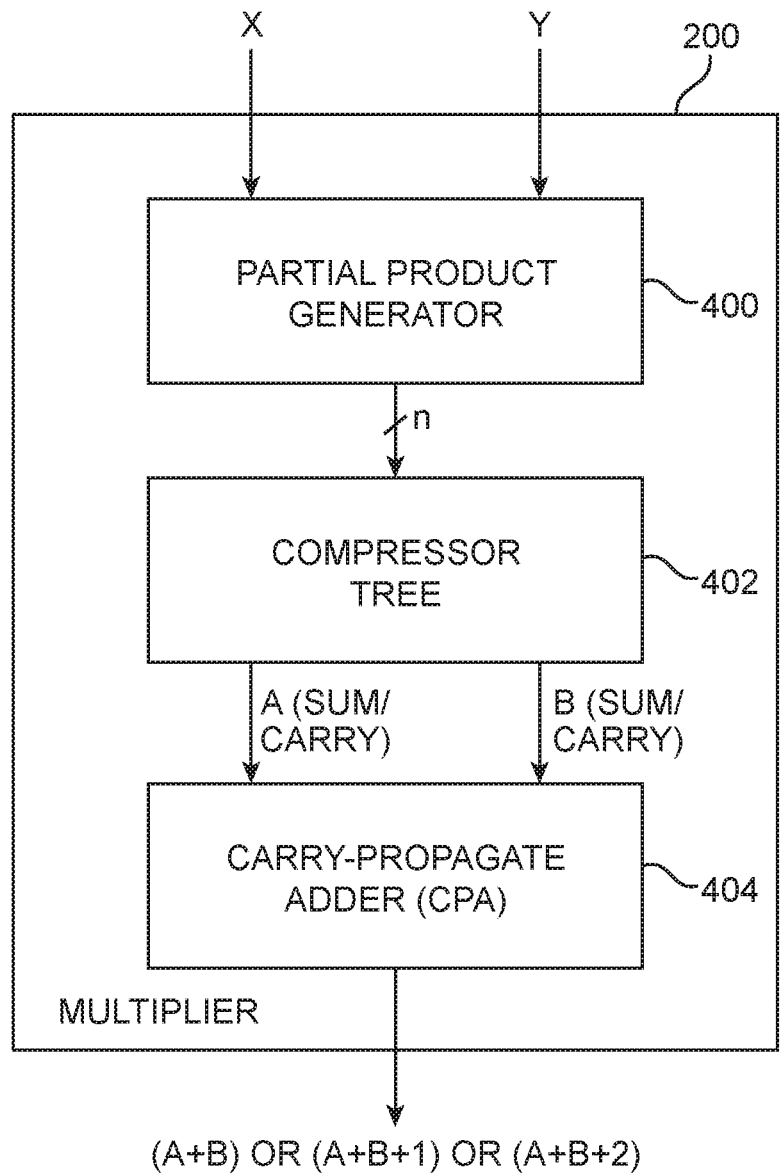
FIG. 4 is a diagram showing how a multiplier circuit may include carry-propagate adder circuitry in accordance with an embodiment.

FIG. 4 is a diagram showing one suitable implementation of multiplier circuit 200 (e.g., multiplier circuit 200-1 and/or 200-2 of FIG. 2). As shown in FIG. 4, multiplier circuit 200 may include a partial product generator such as partial product generator 400, a compressor tree such as compressor tree circuit 402, and a carry-propagate adder (CPA) such as CPA circuitry 404. Multiplier 200 may receive two input numbers X and Y to be multiplied together. Partial product generator 400 may receive the input numbers X and Y and output n corresponding partial products.

Compressor tree 402 may receive the n partial products from partial product generator 400 and output first sum/carry vectors A and second sum/carry vectors B. Carry-propagate adder 404 may receive vectors A and B and may be configured to compute a first result that is equal to the sum of A and B, a second result that is equal to the sum of A, B, and one, and a third result that is equal to the sum of A, B, and two. A selected one of these three results may be output based on rounding of the least significant bits (LSBs) in the addition of vectors A and B.

Figure 5:
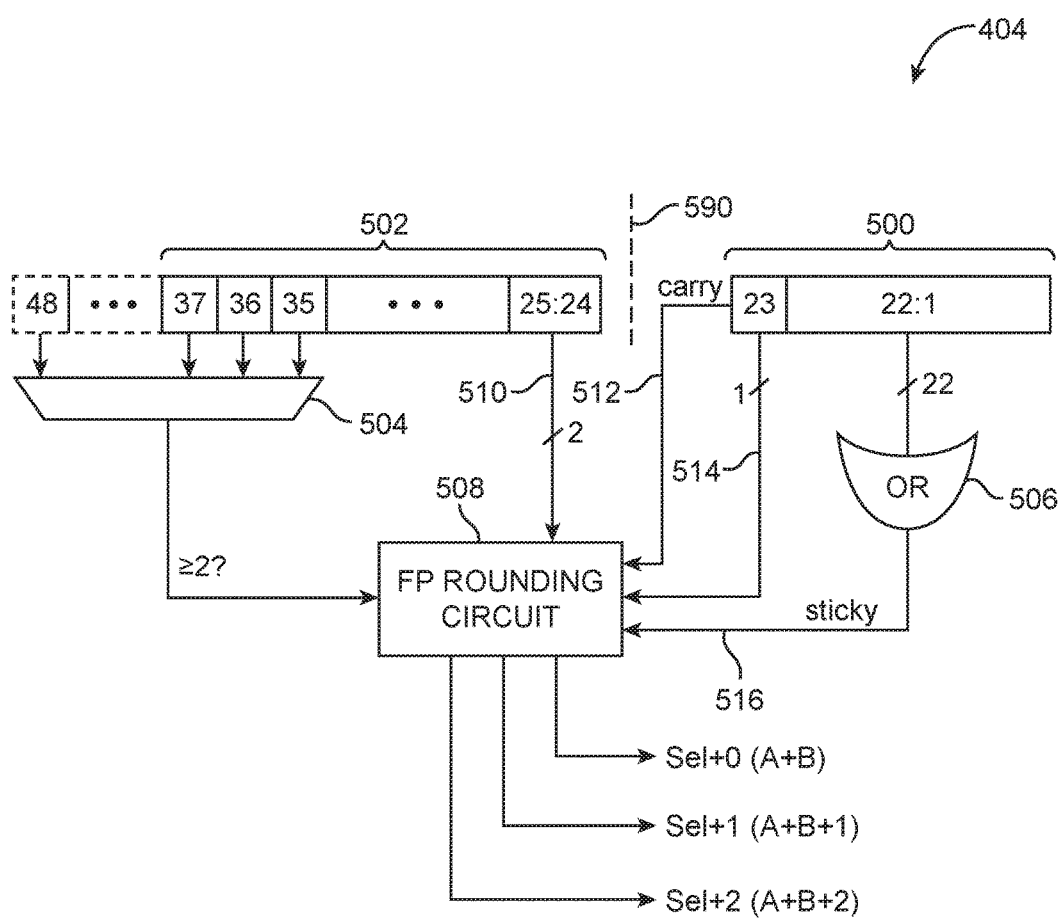
FIG. 5 is a diagram of an illustrative carry-propagate adder and an associated rounding circuit that can be configured to support multiple mantissa sizes in accordance with an embodiment.

As described above, each multiplier 200 may be an 18-by-19 multiplier, which can support up to 37 fractional bits. FIG. 5 shows how CPA circuitry 404 may be decomposed into two portions: (1) a lower 23-bit carry-propagate adder 500 and (2) an upper 14-bit carry-propagate adder 502. The boundary between lower CPA 500 and upper CPA 502 demarcates the nominal rounding position for FP32, as indicated by dotted line 590. For efficiency purposes, it may be desirable to map the rounding position of variable multiplier 200 to this predetermined location as well, so that all of the FP32 rounding logic, which takes up the majority of the increase in logic when converting a fixed-point multiply into a floating-point multiply, can be reused.

Thus, to support FP16, the 10-bit mantissa may be mapped to bits [33:24], where the 34th bit is the implied one bit, and where the 35th bit indicates whether the normalized number is actually greater than or equal to two. Similarly, FP17 may be supported by mapping an 11-bit mantissa to bits [34:24], where the 35th bit is the implied one bit, and where the 36th bit indicates whether the normalized number is actually greater than or equal to two. As yet another example, FP18 may be supported by mapping a 12-bit mantissa to bits [35:24], where the 36th bit is the implied one bit, and where the 37th bit indicates whether the normalized number is actually greater than or equal to two.

Note that in this particular example, CPA 502 can only support up to a maximum 12-bit mantissa, since CPA 502 cannot be extended past the 37th bit position when multipliers 200 are being used separately (e.g., CPA 502 can only be extended past the 37th bit when used to support FP32 since both multipliers 200-1 and 200-2 are combined). If desired, FP20 can also be supported using this scheme if FP20 were modified to include one sign bit, seven exponent bits, and only 12 mantissa bits.

As shown in FIG. 5, the variable precision may be supported using a multiplexing circuit such as multiplexer 504 to select among either the 35th bit (when supporting any float-point format with a 10-bit mantissa), the 36th bit (when supporting any floating-point format an 11-bit mantissa), the 37th bit (when supporting any floating-point format with a 12-bit mantissa), or the 48th bit from yet another CPA (when supporting FP32). Configured in this way, multiplexer 504 outputs a selected most significant bit (MSB) that is reflective of the greater-than-or-equal-to-two condition to floating-point rounding circuitry 508.

Rounding circuitry 508 may also receive the two least significant bits (LSBs) of CPA 502 (e.g., bits [25:24]) as indicated by path 510, the carry-out signal of lower CPA 500 as indicated by path 512, the MSB of lower CPA 502 as indicated by path 514, and the "sticky" bit, which is the logic OR result of the remaining LSBs of CPA 500, as indicated by path 516 (see, e.g., logic OR gate 506 ORing together the bottom 22 bits of CPA 500). Arranged in this way, rounding circuit 508 can determine whether the resulting mantissa is simply the lowermost bits of CPA 502 (e.g., the lower 10 bits in the case of a 10-bit mantissa), the lower bits plus 1, or the lower bits plus 2 (i.e., the lower bits right-shifted by one bit position). In other words, a "Sel+0" signal will be asserted to indicate that the result should be simply A+B; a "Sel+1" signal will be asserted to indicate that the result should be A+B+1; and a "Sel+2" signal will be asserted to indicate that the result should be A+B+2. The generator of these three different sum outputs will be described below in connection with FIGS. 7-13. In the example of FIG. 5, the mantissa is entirely contained within CPA 502 while CPA 500 contains the lower bits of the mantissa multiplication that are used to determine a rounding position. If desired, zeros may be appended to the multiplier inputs so that the mantissa is entirely contained within CPA 502, and the MSBs of CPA 500 contains lower bits of the mantissa multiplication that are used to determine a rounding position. In this situation, the LSBs of CPA 500 may contain zeroes.

Figure 6:
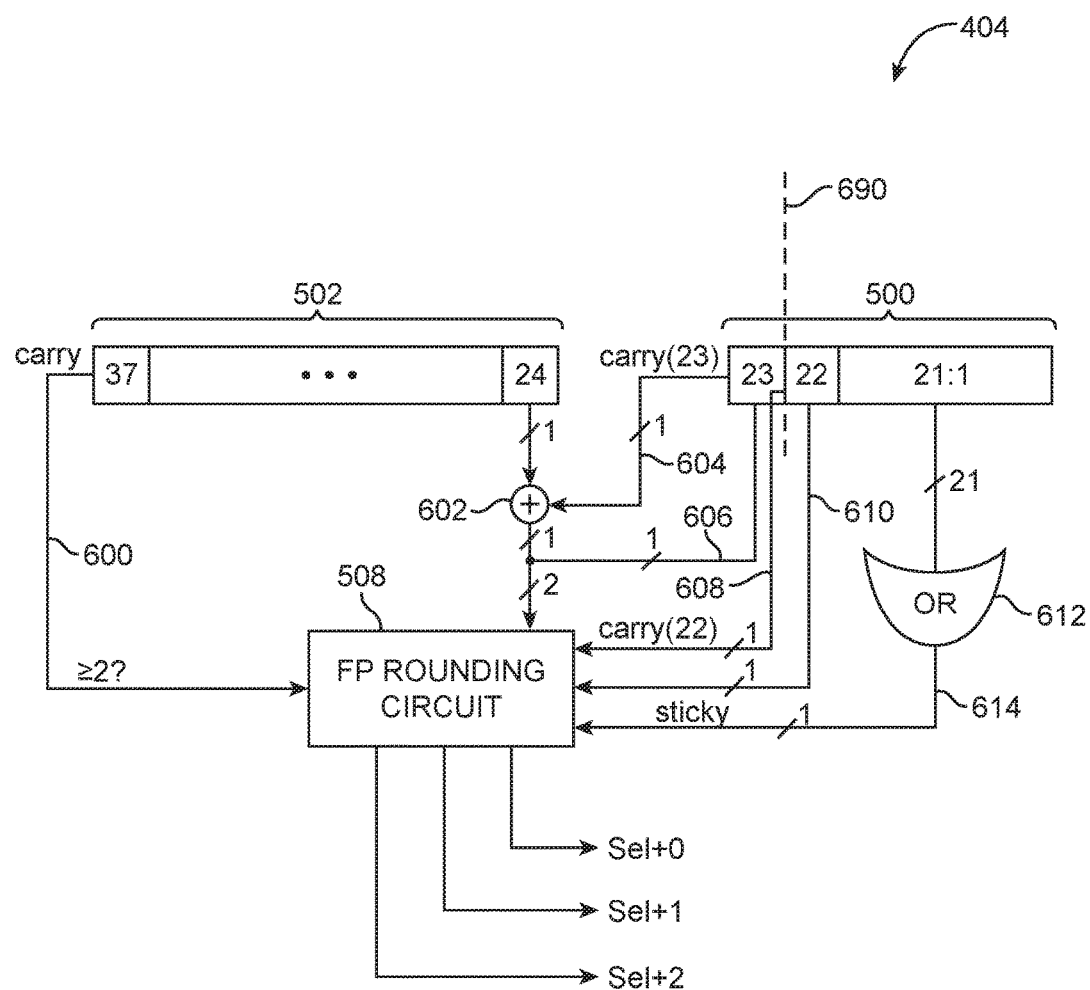
FIG. 6 is a diagram of an illustrative carry-propagate adder and an associated rounding circuit that can be configured to support an expanded mantissa width in accordance with an embodiment.

As described above, a 14-bit mantissa cannot be supported directly by the natural CPA rounding position 590 shown in FIG. 5. As shown in FIG. 3, FP20 may require a 14-bit mantissa. FIG. 6 shows another suitable embodiment in which CPA circuitry 404 can be used to support a 14-bit mantissa. To support the extra precision, the rounding position is effectively shifted to the right by one bit position, as indicated by dotted line 690. In other words, the 14 mantissa bits span bits [36:23]. The 37th bit serves as the implied leading one. Since the 38th bit is unavailable, it can be synthesized by reusing the carry-out signal from CPA 502. In this example, the LSBs of the mantissa may be contained in CPA 500.

Configured in this way, rounding circuit 508 may receive the carry-out signal from the MSB of CPA 502, which is reflective of the greater-than-or-equal-to-two condition. Since the rounding position is now shifted to the MSB of CPA 500, the two LSBs of the mantissa are now a combination of the LSB of CPA 502 and the MSB of CPA 500. As shown in FIG. 6, one-bit adder 602 may receive the 24th bit from CPA 502 and the carry out from the 23rd bit from CPA 500 (as indicated by path 604). The output of adder 602 may then be combined with the 23rd bit from CPA 500 routed over path 606 and fed to rounding circuit 508. Rounding circuit 508 may now receive the carry-out signal of the 22nd bit (as indicated by path 608), the 22nd bit (as indicated by path 610), and the sticky bit, which is the logic OR result of the remaining LSBs of CPA 500, as indicated by path 614 (see, e.g., logic OR gate 612 ORing together the bottom 21 bits of CPA 500). Similar to the rounding block of FIG. 5, rounding circuit 508 of FIG. 6 may be used to select with of the three CPA outputs is used (e.g., the sums A+B, A+B+1, and A+B+2 must still be computed).

The arrangement of FIG. 6 in which CPA circuitry 404 can be used to support at least a 14-bit mantissa is merely illustrative and does not serve to limit the scope of the present embodiments. The embodiments of FIGS. 5 and 6 are also not mutually exclusive. In other words, the two different configurations of FIGS. 5 and 6 can be combined into a single embodiment using simple 2:1 multiplexers (e.g., using five 2:1 multiplexers) and an additional logic AND gate for the MSB input to the sticky OR gate, which is a trivial increase in logic. If desired, an even greater number of mantissa bits can be supported by further shifting the rounding position further to the right (e.g., by shifting virtual decomposition boundary 690 more towards the LSB of CPA 500).

Figure 7A:
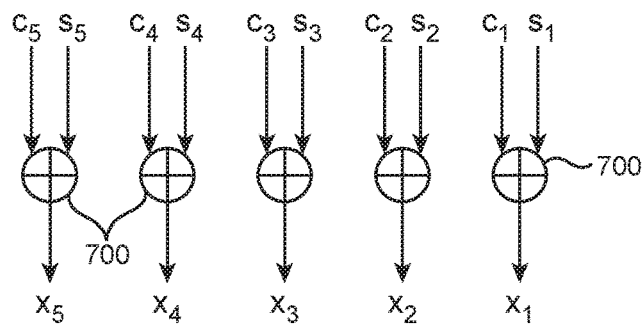
FIGS. 7A-7C are diagrams of illustrative adder circuitry that can be used to generate a sum output in accordance with an embodiment.
Figure 7B:
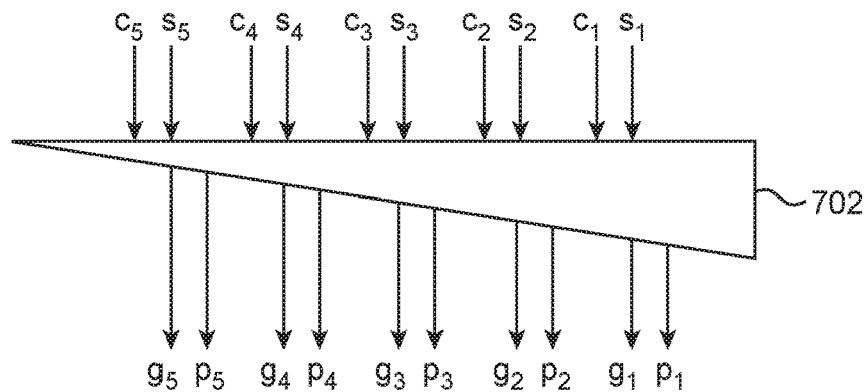
Figure 7C:
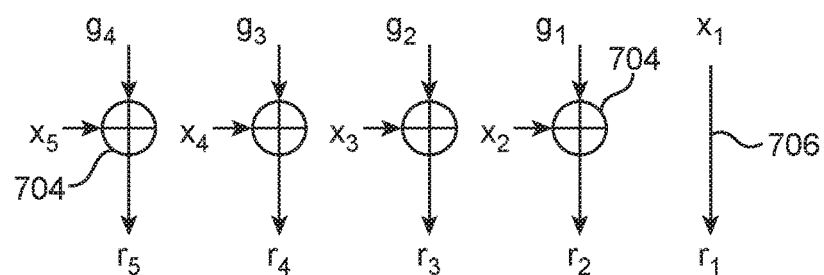

FIGS. 7A-7C shows one suitable implementation of carry-propagate adder circuitry that outputs the sum A+B. As shown in FIG. 7A, the sum and carry vectors may be bit-wise XORed together using logic exclusive-OR (XOR) gates 700 to yield intermediate values x (e.g., bits x1-x5). Only five bits are shown in FIGS. 7A-7C, but it should be understood that the CPA may be adapted to support addition of any desired mantissa width. FIG. 7B shows how a prefix tree such as prefix tree 702 may also receive the sum and carry vectors and output corresponding generate ($g_i$) signals (equivalent to "carry" signals) and propagate ($p_i$) signals. As shown in FIG. 7C, the generate signals may then be XORed with intermediate values x using logic XOR gates 704 to yield final output values r, which represent the sum of A+B. In particular, the LSB r1 bit may be a simple pass-through of value x1, as indicated by wire 706. The exemplary arrangement shown in FIGS. 7A-7C is sometimes referred to as a parallel prefix carry-propagate adder.

Figure 8:
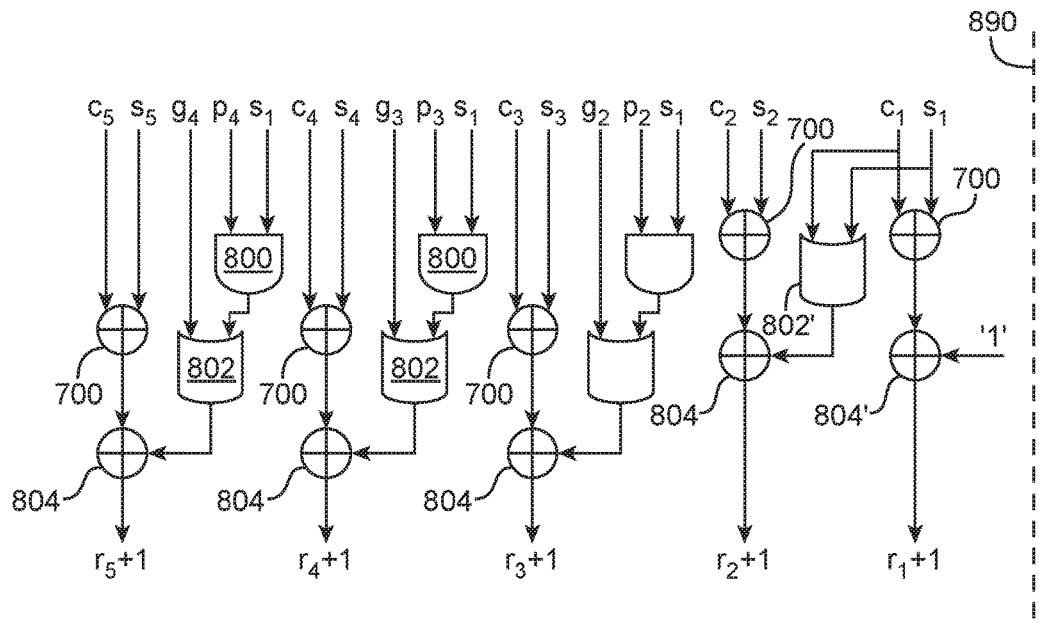
FIG. 8 is a diagram of illustrative adder circuitry that can be used to generate a first incremented sum output in accordance with an embodiment.

FIG. 8 is a circuit diagram of circuitry within the carry-propagate circuitry that can be used to inexpensively compute a first incremented sum A+B+1. As shown in FIG. 8, a portion of the adder circuitry may reuse logic XOR gates 700 from FIG. 7A. Each bit position may, however, further include logic AND gate 800 that receives an LSB sum bit s1 and a corresponding propagate signal, a logic OR gate 802 that receives an output from gate 800 and a corresponding generate signal, and an additional logic XOR gate 804 that receives output signals from associated gates 700 and 802. For example, gate 800 in the 5th bit position may receive bit s1 and fourth propagate signal p4, whereas gate 800 in the 4th position may receive bit s1 and the third propagate signal p3. Similarly, gate 802 in the 5th bit position may receive the fourth generate signal g4, whereas gate 802 in the 4th bit position may receive the third generate signal g3.

The computation of the two LSBs may be different. Logic XOR gate 804' in the LSB position has a first input that receives an output from corresponding gate 700 and a second input that receives a logic "1," which effectively reduces the computation to a simple inversion. In the second LSB position, logic OR gate 802' may directly receive sum bit s1 and carry bit c1 from the first bit position.

Figure 9:
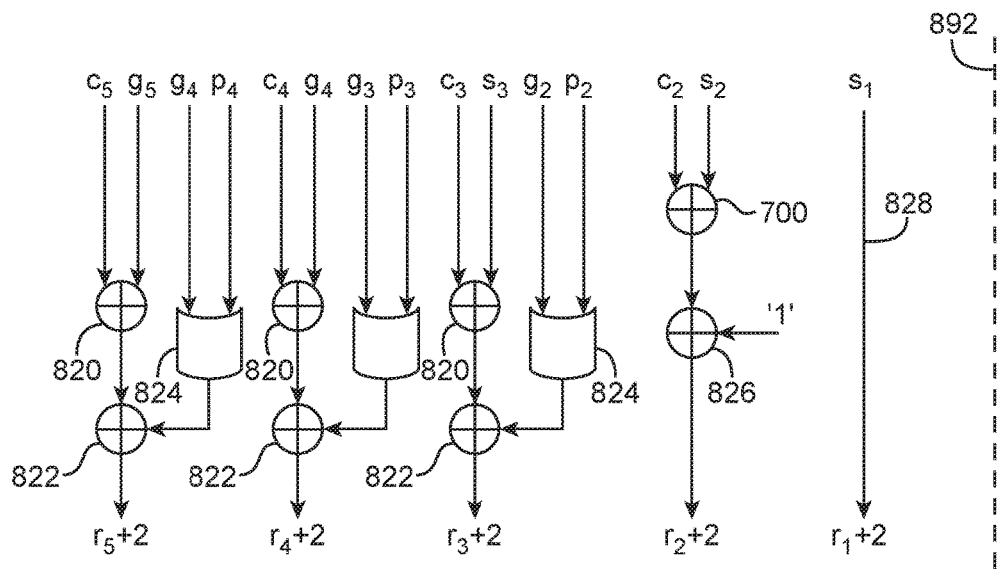
FIG. 9 is a diagram of illustrative adder circuitry that can be used to generate a second incremented sum output in accordance with an embodiment.

FIG. 9 is a circuit diagram of circuitry within the carry-propagate circuitry that can be used to inexpensively compute a second incremented sum A+B+2. As shown in FIG. 9, each bit position may include a first logic XOR gate 820 that receives a carry signal and a generate signal for that bit position, a logic OR gate 824 that receives a generate signal and a propagate signal from a previous bit position, and a second logic XOR gate 822 that receives output signals from both gates 820 and 824. For example, gate 820 in the 5th bit position may receive fifth carry bit c5 and fifth generate bit g5, whereas gate 824 in the 5th position may receive fourth generate bit g4 and fourth propagate bit p4. Similarly, gate 820 the 4th bit position may receive fourth carry bit c4 and fourth generate bit g4, whereas gate 824 in the 4th position may receive third generate bit g3 and third propagate bit p3, and so on.

The computation of the two LSBs may be different. The LSB is a simple pass-through of the LSB sum bit s1, as indicated by wire 828. The second LSB is simply inverted, using logic XOR gate 826 having a second input that receives a logic "1." The exemplary arrangement shown in FIGS. 10 and 11 is sometimes referred to as a flagged prefix carry-propagate adder.

The CPA circuitry shown in FIGS. 8 and 9 may be aligned to CPA 502 of FIG. 5 (e.g., the LSB output bit r1 corresponds to the 24th bit position, the second LSB output bit r2 corresponds to the 25th bit position, etc.). In other words, rounding position 590 in FIG. 5 is aligned to dotted line 890 in FIG. 8 and dotted line 892 in FIG. 9.

In order to support the CPA circuitry of FIG. 6 where the LSB of the mantissa is shifted one bit to the right, CPA 500 and 502 will need to be bridged so that the 23rd bit position becomes the LSB of the mantissa. FIGS. 10 and 11 show illustrative bridged adder circuitry that can be used to generate the first and second incremented sums, respectively. In FIG. 10, dotted line 1000 marks the old rounding position. As shown in FIG. 10, the 23rd bit becomes the new LSB of the mantissa, while the 24th bit corresponding to labels c1 and s1 becomes the second LSB of the mantissa. Similarly, in FIG. 11, dotted line 1100 marks the old rounding position. As shown in FIG. 11, the 23rd bit becomes the new pass-through LSB, while the 24th bit corresponding to an inverted XOR result of c1 and s1 becomes the second LSB of the mantissa.

Figure 10:
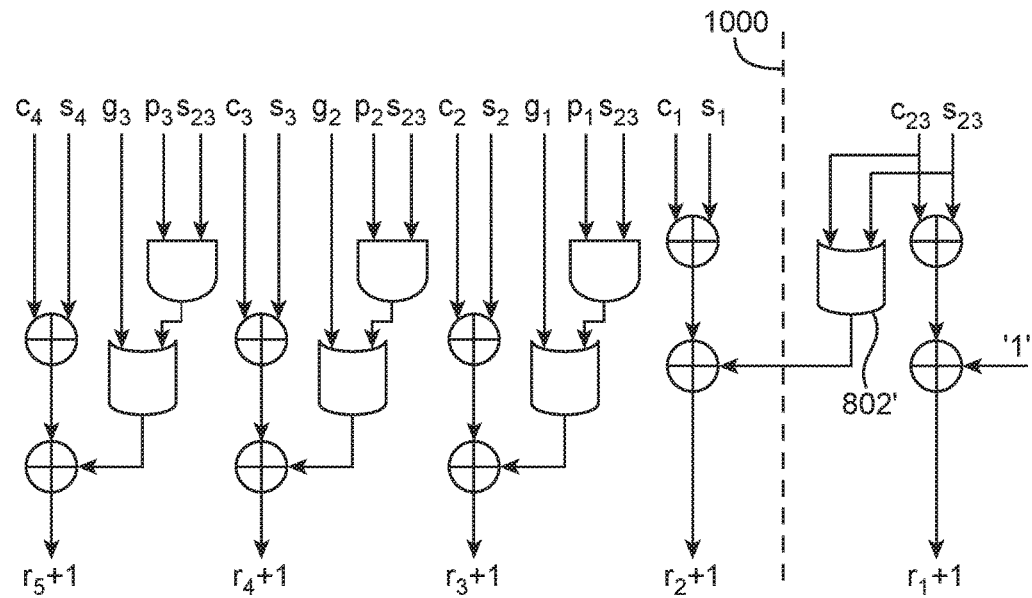
FIG. 10 is a diagram of illustrative bridged adder circuitry that can be used to generate the first incremented sum output in accordance with an embodiment.
Figure 11:
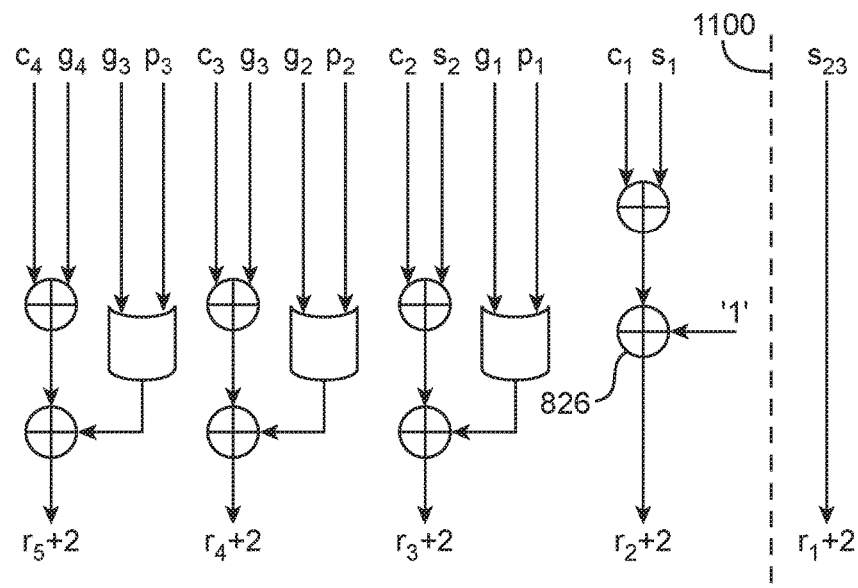
FIG. 11 is a diagram of illustrative bridged adder circuitry that can be used to generate the second incremented sum output in accordance with an embodiment.

As described above, the primary difference between the non-bridged mode of FIGS. 8 and 9 and the bridged mode of FIGS. 10 and 11 is the position of the mantissa LSB. In the non-bridged arrangement, the actual LSB of CPA 502 (e.g., the 24th bit in the example of FIG. 5) serves as the LSB of the mantissa. In the bridged arrangement, the MSB of CPA 500 (e.g., the 23rd bit in the example of FIG. 6) serves as the LSB of the mantissa.

Figure 12:
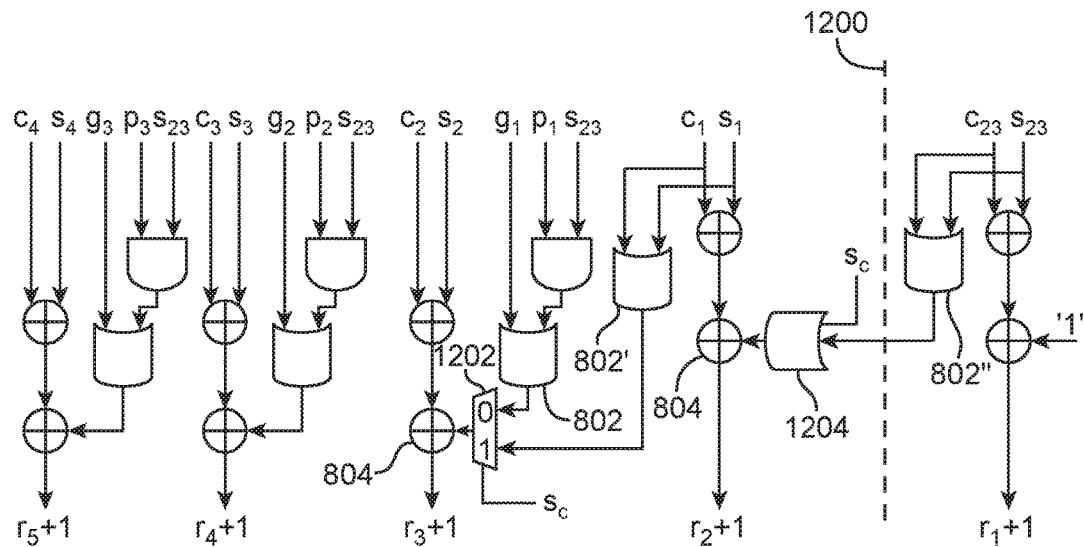
FIG. 12 is a diagram of illustrative configurable adder circuitry that can be used to generate the first incremented sum output in accordance with an embodiment.

FIG. 12 shows a configuration in which the circuitry of FIGS. 8 and 10 are combined into a single embodiment to output first incremented sum A+B+1. The adder circuitry of FIG. 12 builds on the adder circuitry of FIG. 10. Dotted line 1200 in FIG. 12 corresponds to the natural boundary between CPA 500 and 502 (see boundary 590 in FIG. 5). As shown in FIG. 12, a multiplexer 1202 may be inserted at the output of logic OR gate 802 at the 25th bit position. In particular, multiplexer 1202 may have a first (0) input that receives an output signal from gate 802, a second (1) input that receives an output signal from logic OR gate 802', a control input that receives control signal Sc, and an output that is coupled to corresponding logic XOR gate 804. Moreover, a logic OR gate 1204 may be inserted at boundary 1200 between the 23rd bit and the 24th bit. In particular, logic OR gate 1204 may have a first input that receives an output signal from logic OR gate 802'' from the preceding bit, a second input that receives control signal Sc, and an output that is connected to corresponding logic XOR gate 804 in the 24th bit position.

Configured in this way, control signal Sc may be asserted (e.g., driven high) in the non-bridged mode to force the output of gate 1204 high and to configure multiplexer 1202 to selectively route signals from its second (1) input to its output, thus mirroring the configuration in FIG. 8. When control signal Sc is deasserted (e.g., driven low) in the bridged mode, logic gate 1204 merely serves as a pass-through such that the 23rd bit becomes the new mantissa LSB and multiplexer 1202 is configured to selectively route signals from its first (0) input to its output, thus mirroring the configuration in FIG. 10.

Figure 13:
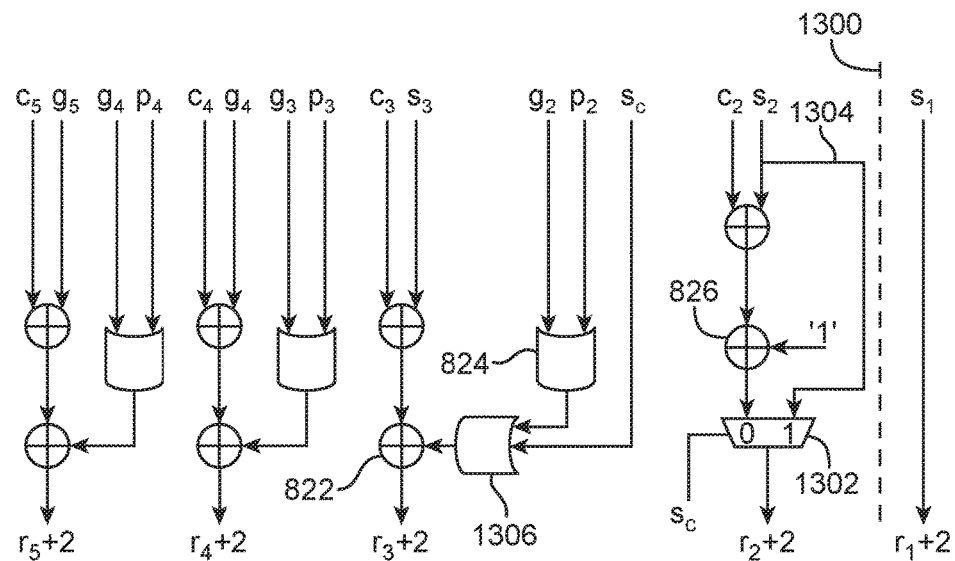
FIG. 13 is a diagram of illustrative configurable adder circuitry that can be used to generate the second incremented sum output in accordance with an embodiment.

FIG. 13 shows a configuration in which the circuitry of FIGS. 9 and 11 are combined into a single embodiment to output second incremented sum A+B+2. The adder circuitry of FIG. 13 builds on the adder circuitry of FIG. 11. Dotted line 1300 in FIG. 13 corresponds to the natural boundary between CPA 500 and 502 (see boundary 590 in FIG. 5). As shown in FIG. 13, a multiplexer 1302 may be inserted at the output of logic XOR gate 826. In particular, multiplexer 1302 may have a first (0) input that receives an output signal from gate 826, a second (1) input that receives the corresponding input sum bit directly as indicated by wire 1304, a control input that receives control signal Sc, and an output at which an output sum bit is generated. Moreover, a logic OR gate 1306 may be inserted between logic gates 824 and 822 in the next LSB. In particular, logic OR gate 1306 may have a first input that receives an output signal from logic OR gate 824, a second input that receives control signal Sc, and an output that is connected to corresponding logic XOR gate 822.

Configured in this way, control signal Sc may be asserted (e.g., driven high) in the non-bridged mode to force the output of gate 1306 high and to configure multiplexer 1302 to selectively route signals from its second (1) input to its output, thus mirroring the configuration in FIG. 9. When control signal Sc is deasserted (e.g., driven low) in the bridged mode, logic gate 1306 merely serves as a pass-through while multiplexer 1302 is configured to selectively route signals from its first (0) input to its output, thus mirroring the configuration in FIG. 11.

Figure 14:
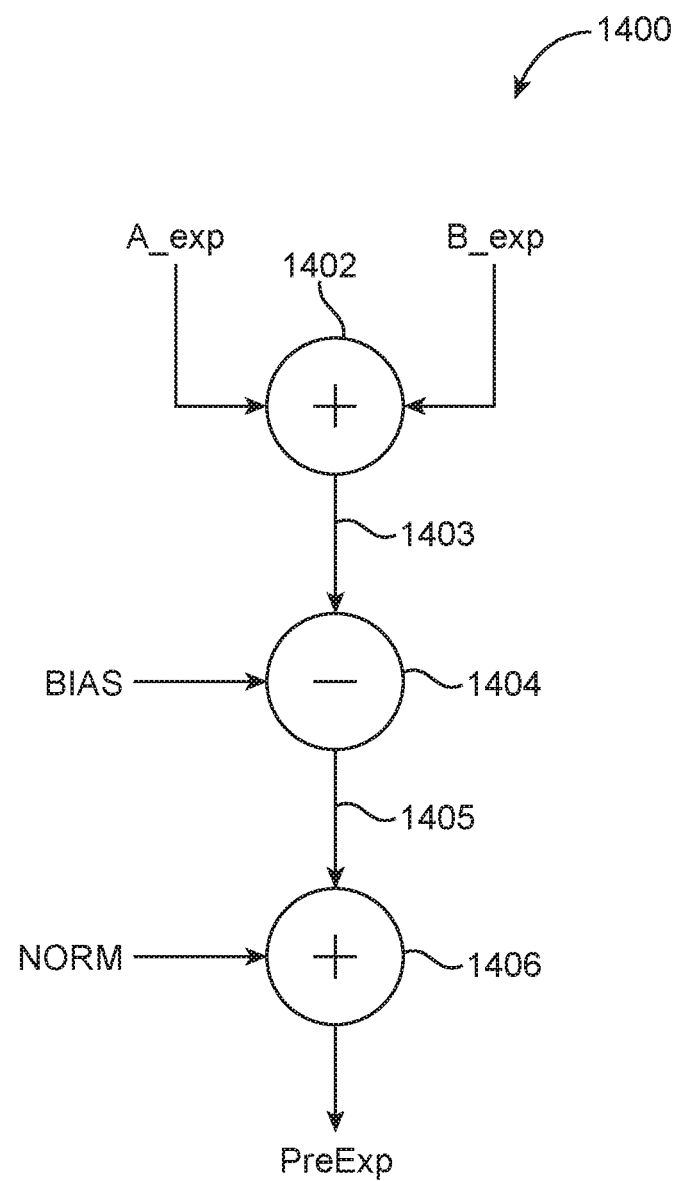
FIG. 14 is a diagram of illustrative exponent handling circuitry in accordance with an embodiment.

The embodiments of FIGS. 5-13 relate to circuitry for handling the mantissas during the multiplication operation. In accordance with other embodiments, FIG. 14 shows circuitry 1400 for handling exponents for floating-point numbers with variable precision. As shown in FIG. 14, circuitry 1400 may include an input adder stage 1402, a bias subtraction stage 1404, and a normalization stage 1406. Adder circuit 1402 may include a first input that receives a first exponent A_exp, a second input that receives a second exponent B_exp, and an output at which the sum of the two input exponents is provided.

The value at output 1403 may be subtracted by a bias value using subtraction circuit 1404. Consider a scenario in which the maximum exponent supported by circuitry 1400 is 8 bits. All additions and subtractions within circuitry 1400 for exponent widths less than 8 bits can be calculated by simply zeroing out the unused MSBs. For example, if the exponent precision is set to only 5 bits, the bias value may be set to "00001111," which is equivalent to 15 in base ten. As other examples, the bias value may be set to "00011111" for an exponent precision of 6 bits, to "00111111" for an exponent precision of 7 bits, and to "01111111" for an exponent precision of 8 bits. Note that only the upper four bits are being varied in this particular example, so the bottom four LSBs of the bias value may be hardwired to a logic one.

The difference value at output 1405 may then be selectively incremented by a normalization value using adder circuit 1406. Continuing with the 8 bit example above, the normalization value may be set to "00000000" for the non-bridged mode and may be set to "00000001" for the bridged mode (i.e., when right-shifting the rounding position of the mantissa by one bit). In other words, only the LSB of the normalization value toggles between the two modes while all leading bits are zeroes. Since only the LSB changes, the normalization adjustment implementation is identical for all exponent sizes. Operated as such, output adder circuit generates a corresponding pre-exponent output.

Figure 15:
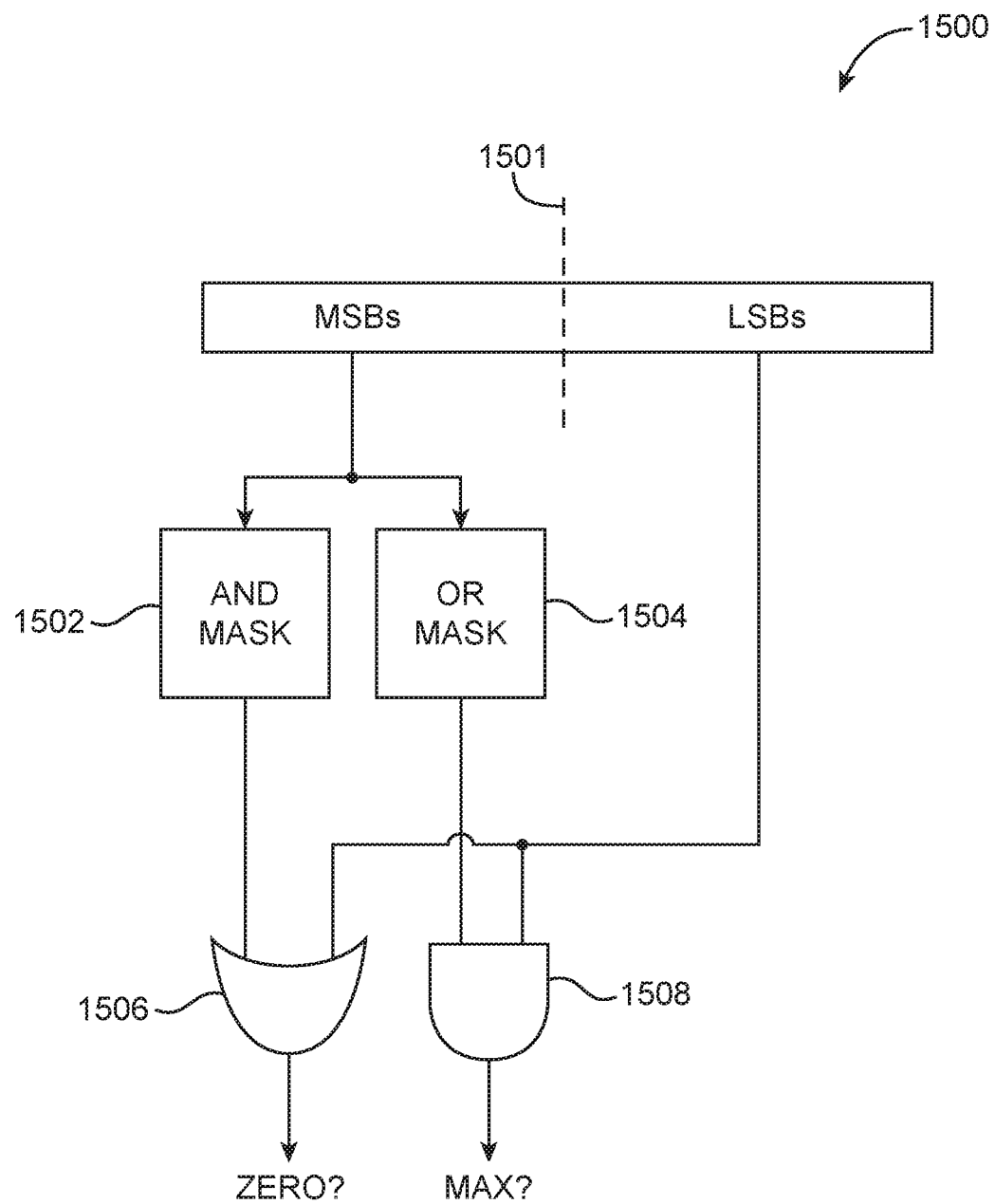
FIG. 15 is a diagram of illustrative exception handling circuitry in accordance with an embodiment.

In additional to the exponent handling circuitry, exceptions must also be handled for both the mantissas and the exponents. This includes checking the inputs and outputs for underflow, overflow (infinity), and special numbers such as "NaN" (i.e., a number divided by zero). FIG. 15 is a diagram of illustrative exception handling circuitry 1500 that can be used to detect exceptions for floating-point numbers with variable precision.

Consider an example in which circuitry 1500 is used to handle exponent exceptions and in which the maximum exponent supported is 9 bits. If the current exponent is 6 bits, the upper MSBs of the exponent will be ANDed with "0001" using AND mask 1502 and also ORed with "1100" using OR mask 1504. Thus, the resulting value passed to final logic OR gate 1506 will be "000XXXXXX," where the 6 LSB bits are simply passed through. If the output of gate 1506 is zero, a zero value has been detected. On the other hand, the resulting value passed to final logic AND gate 1508 will be "111XXXXXX," wherein the 6 LSB bits are also simply passed through. If the output of gate 1508 is high, then an overflow (infinity) has been detected.

The tables below illustrate the AND mask 1502 and the OR mask 1504 for the upper bits for exponent precisions ranging from 5-8 bits (as examples):

| Exponent Precision | AND MASK |
|---|---|
| 5 | 0000 |
| 6 | 0001 |
| 7 | 0011 |
| 8 | 0111 |
| . . . | . . . |

| Exponent Precision | OR MASK |
|---|---|
| 5 | 1110 |
| 6 | 1100 |
| 7 | 1000 |
| 8 | 0000 |
| . . . | . . . |

If desired, circuitry 1500 may also be used for mantissa exception handling. The tables below illustrate the AND mask 1502 and the OR mask 1504 for the upper bits for mantissa precision ranging from 10-14 bits (as examples):

| Mantissa Precision | AND MASK |
|---|---|
| 10 | 0000 |
| 11 | 0001 |
| 12 | 0011 |
| 14 | 0111 |
| . . . | . . . |

| Mantissa Precision | OR MASK |
|---|---|
| 10 | 1110 |
| 11 | 1100 |
| 12 | 1000 |
| 14 | 0000 |
| . . . | . . . |

Similar to the exponent handling, if the output of gate 1506 is zero, a zero value has been detected for the mantissa. On the other hand, if the output of gate 1508 is high, then an overflow (infinity) has been detected for the mantissa.

The circuitry of FIGS. 14 and 15 are not mutually exclusive with the embodiments of FIGS. 5-13. In fact, the exponent handing circuitry of FIG. 14 and the exception handling circuitry of FIG. 15 can be combined with the mantissa CPA circuitry discussed in connection with FIGS. 5-13 when implementing a floating-point multiplier with variable precision.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA/INTEL Corporation.

The foregoing is merely illustrative of the principles of this invention and various modifications can be made by those skilled in the art. The foregoing embodiments may be implemented individually or in any combination.

What is claimed is:

1. Multiplier circuitry on an integrated circuit die, comprising:
   a first adder circuit configured to generate a first carry output signal;
   a second adder circuit configured to generate a second carry output signal; and
   a rounding circuit that is coupled to the first and second adder circuit, wherein the rounding circuit is configured to perform rounding based on the first and second carry output signals, and wherein the first and second adder circuits generate a first floating-point multiplier output having a first precision in a first mode and further generate a second floating-point multiplier output having a second precision that is different than the first precision in a second mode.

2. The multiplier circuitry of claim 1, wherein the first and second adder circuits comprise carry-propagate adders.

3. The multiplier circuitry of claim 1, wherein a mantissa of the first precision is entirely contained within the first adder circuit, and wherein only a portion of the second adder circuit contains lower bits of a mantissa of the second precision in the second mode.

4. The multiplier circuitry of claim 1, wherein zeroes are appended to multiplier inputs of the second mode, wherein the most significant bits of the second adder circuit contains lower bits of the mantissa that are used to determine a rounding decision, and wherein the least significant bits of the second adder circuit contain zeroes.

5. The multiplier circuitry of claim 1, wherein the first and second adder circuits generate a third floating-point multiplier output having a third precision in a third mode, and wherein the least significant bit of a mantissa of the third precision is contained in the second adder circuit.

6. The multiplier circuitry of claim 1, wherein the first adder circuit comprises:
   a first logic XOR gate that outputs a first sum bit;
   a multiplexer having an output that is connected to the first logic XOR gate, wherein the multiplexer receives a control signal that determines whether the multiplier circuitry is operating in the first or second mode
   a second logic XOR gate that outputs a second sum bit; and
   a logic OR gate having an output that is connected to the second logic XOR gate and that also receives the control signal.

7. The multiplier circuitry of claim 1, wherein the first adder circuit comprises:
   a first logic XOR gate that outputs a first sum bit;
   a logic OR gate having an output that is connected to the first logic XOR gate and that receives a control signal that determines whether the multiplier circuitry is operating in the first or second mode;
   a second logic XOR gate that receives a logic one; and
   a multiplexer having an input that is connected to the second logic XOR gate and that also receives the control signal.

8. The multiplier circuitry of claim 1, wherein the first adder circuit comprises:
   a logic OR gate;
   a first logic XOR gate; and
   a second logic XOR gate configured to receive signals from the logic OR gate and the first logic XOR gate.

9. The multiplier circuitry of claim 1, wherein the first adder circuit comprises:
   a logic AND gate;
   a logic OR gate configured to receive signals from the logic AND gate; and
   a logic XOR gate configured to receive signals from the logic OR gate.

10. The multiplier circuitry of claim 1, further comprising exponent handling circuitry, wherein the exponent handling circuitry comprises:
    an input adder circuit configured to generate a first output; and
    a subtraction circuit configured to receive the first output from the input adder circuit, to receive an adjustable bias value, and to generate a second output.

11. The multiplier circuitry of claim 1, further comprising exception handling circuitry, wherein the exception handling circuitry comprises:
    an input configured to receive a portion of the first floating-point multiplier output in the first mode and to receive a portion of the second floating-point multiplier output in the second mode; and
    a logic gate mask that varies depending on the precision of the first floating-point multiplier output in the first mode and the second floating-point multiplier output in the second mode.

12. Multiplier circuitry on an integrated circuit die, comprising:
    a first adder circuit;
    a second adder circuit;
    a rounding circuit that is coupled to the first and second adder circuit, wherein the first and second adder circuits generate a first floating-point multiplier output having a first precision in a first mode and further generate a second floating-point multiplier output having a second precision that is different than the first precision in a second mode; and
    a multiplexing circuit that receives a plurality of most significant bits from the first adder circuit and outputs a selected one of the plurality of most significant bits to the rounding circuit.

13. Multiplier circuitry on an integrated circuit die, comprising:
    a first adder circuit;
    a second adder circuit;
    a rounding circuit that is coupled to the first and second adder circuit, wherein the first and second adder circuits generate a first floating-point multiplier output having a first precision in a first mode and further generate a second floating-point multiplier output having a second precision that is different than the first precision in a second mode; and
    an additional adder circuit that receives a least significant bit of the first adder circuit and a carry out signal from a most significant bit of the second adder circuit.

14. The multiplier circuitry of claim 13, wherein the additional adder circuit is coupled between the first adder circuit and the rounding circuit.

15. The multiplier circuitry of claim 13, wherein the additional adder circuit is configured to generate a sum bit that is routed to the rounding circuit.

16. The multiplier circuitry of claim 15, wherein the rounding circuit is configured to receive an additional carry out signal that is different than the carry out signal from a second most significant bit of the second adder.

17. The multiplier circuitry of claim 9, further comprising a multiplexer coupled between the logic OR gate and the logic XOR gate.

\* \* \* \* \*